May 30, 1950      G. E. HEYL      2,509,498
ELECTROLYTIC CHARGE FORMING DEVICE
Filed Aug. 10, 1945
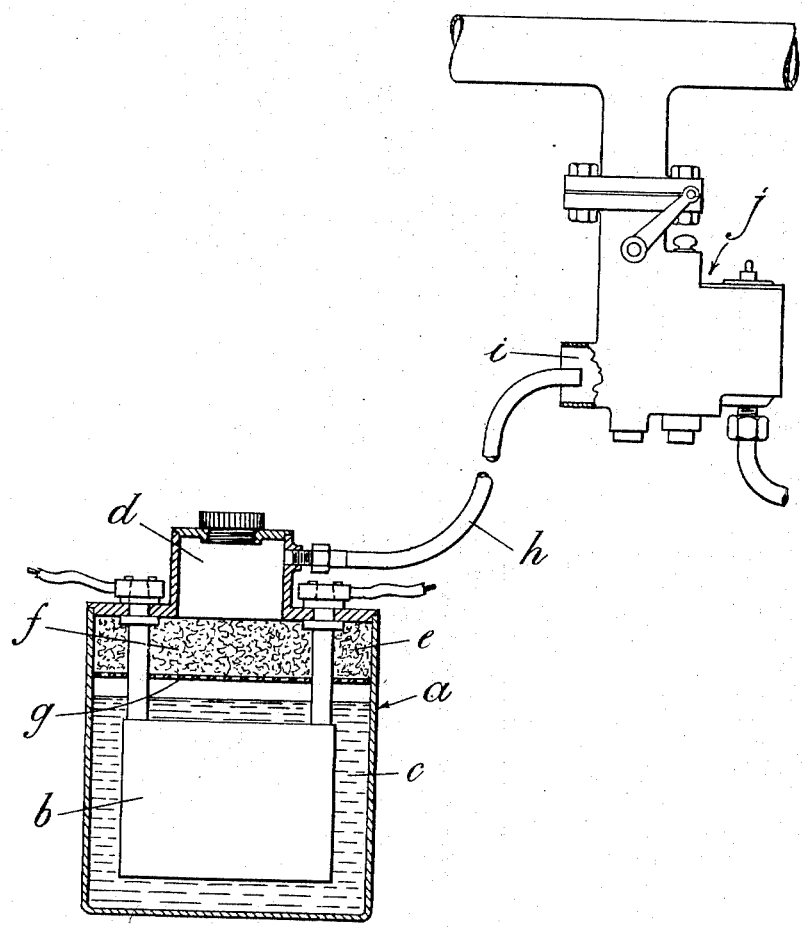
INVENTOR
George E. Heyl
BY
ATTORNEY

UNITED STATES PATENT OFFICE 2,509,498

ELECTROLYTIC CHARGE FORMING DEVICE

George Edward Heyl, Mill Hill, England

Application August 10, 1945, Serial No. 610,097
In Great Britain November 28, 1944

5 Claims. (Cl. 123—119)

This invention relates to apparatus for supplementing the fuel mixture for internal combustion engines.

It is well known that the operation of internal combustion engines is due to the burning or oxidation of mixtures of air and hydrocarbons such as gasoline and other hydrocarbon and fuel oils and the like. The object of this invention is to supplement this fuel air mixture by adding an explosive mixture of oxygen and hydrogen produced by the electrolysis of a suitable compound containing these elements by an electric current produced by the motion of the engine concerned or other suitable means.

It is customary to provide a dynamo in conjunction with an internal combustion engine for the purpose of charging the battery used for ignition and/or starting the engine or for the lighting etc. of a vehicle or vessel in which the engine is installed. Frequently this dynamo produces more current than is required and the excess is wasted as the associated battery is incapable of storing the excess when it reaches a fully charged condition. This surplus current is therefore available for the production of oxygen and hydrogen by electrolysis and the gas mixture used for supplementing the fuel and air mixture for the engine, thereby effecting economy in the use of the fuel.

According to the present invention there is provided apparatus of the type referred to wherein the gas generator is incorporated in the storage battery which supplies current to the electrical equipment of the engine.

In order that the said invention may be clearly understood and readily carried into effect, the same will now be described in its application to an automobile with reference to the accompanying drawing in which the figure is a diagrammatic sectional view of a gas producing cell and the carburetor of an internal combustion engine and also the connection therebetween in accordance with the present invention.

Referring specifically to the drawing, the usual storage battery $a$ is provided with plates $b$, which are combined with electrodes formed from any suitable electro-chemical inert substance, and which are inserted in an appropriate electrolyte $c$, the arrangement being such that when an electric current from the generator driven by the engine is passed through the storage battery $a$ the water content of the electrolyte in the storage battery will be decomposed into oxygen and hydrogen in the manner well known. In order to collect the gases thus produced, the storage battery $a$ is provided with a gas collecting chamber or reservoir $d$, but it is preferred that before the gas reaches the chamber it should pass through a filter $e$, which serves to intercept and absorb any of the electrolyte which, without the provision of a filter, might be carried by the gases to the engine. The filter could conveniently comprise a layer of asbestos or glass wool $f$ supported on a perforated plate $g$ formed from any suitable material.

If desired, the filter material may be impregnated with a suitable carbohydrate or volatile hydro-carbon such as gasoline or benzine, so that the mixture of oxygen and hydrogen passing through the filter material will collect some of the evaporating hydro-carbon gas and enrich the oxygen hydrogen mixture before passing to the engine.

Alternatively, a hydro-carbon can be introduced into the electrolyte, alcohol being suitable for this purpose, so that the oxygen and hydrogen will be enriched by the hydro-carbon gas evaporating from the layer.

From the gas collecting chamber or reservoir $d$ the oxy-hydrogen mixture passes by way of tube $h$ to the air intake $i$ of a carburetor $j$ where it is mixed with the normal engine fuel and conveyed to the cylinders of the engine (not shown) in the usual manner.

The invention is also applicable to a Diesel engine in which case the oxy-hydrogen will be introduced into the fuel injection system.

In the particular application of the present invention to an automobile, electrodes of electro-chemical inert material are combined with the plates of the normal storage battery supplying current to the electrical equipment of the automobile. In this arrangement the current flowing through the battery will then be divided between charging the normal plates of the battery and decomposing the water content of the electrolyte in the battery into oxygen and hydrogen.

What I claim is:

1. In an apparatus for supplying gaseous fuel charges to an internal combustion engine and including a carburetor for supplying vaporized fuel to said engine, and a storage battery for supplying electric current to said engine and containing a plurality of plates immersed in an electrolyte, the combination with the improvements comprising a reservoir in the top of said battery for collecting gases developed in said battery, a filter between said reservoir and the electrolyte in said battery to intercept any electrolyte carried by said gases, and a pipe connecting said reservoir with said carburetor for supplying the gases for mixture with the vaporized fuel supplied by said carburetor.

2. In an apparatus for supplying gaseous fuel charges to an internal combustion engine and including a carburetor for supplying vaporized fuel to said engine, and a storage battery for supplying electric current to said engine and containing a plurality of plates immersed in an electrolyte, the combination with the improvements comprising a reservoir in the top of said battery for collecting gases developed in said battery, a filter between said reservoir and the electrolyte in said battery to intercept any electrolyte carried by said gases, said filter being impregnated with a volatile material for enriching the gases as they pass therethrough, and a pipe connecting said reservoir with said carburetor for supplying the gases for mixture with the vaporized fuel supplied by said carburetor.

3. In an apparatus for supplying gaseous fuel charges to an internal combustion engine and including a carburetor for supplying vaporized fuel to said engine, and a storage battery for supplying electric current to said engine and containing a plurality of plates immersed in an electrolyte, the combination with the improvements comprising a pipe connected directly between the top of said battery and said carburetor to supply gases developed in said battery to said carburetor for mixture with the vaporized fuel supplied thereby, and a quantity of alcohol in said battery and mixed with said electrolyte to enrich the gases developed thereby.

4. In an apparatus for supplying gaseous fuel charges to an internal combustion engine and including a carburetor for supplying vaporized fuel to said engine, and a storage battery for supplying electric current to said engine and containing a plurality of plates immersed in an electrolyte, the combination with the improvements comprising a pipe connected directly between the top of said battery and said carburetor to supply gases developed in said battery to said carburetor for mixture with the vaporized fuel supplied thereby, and electrolytically inert material combined with said battery plates to increase the development of the gases.

5. In an apparatus for supplying gaseous fuel charges to an internal combustion engine and including a carburetor for supplying vaporized fuel to said engine, and a storage battery for supplying electric current to said engine and containing a plurality of plates immersed in an electrolyte, the combination with the improvements comprising a pipe connected directly between the top of said battery and said carburetor to supply gases developed in said battery to said carburetor for mixture with the vaporized fuel supplied thereby, and electrodes of electrolytically inert material combined with said battery plates to increase the development of the gases.

GEORGE EDWARD HEYL.

REFERENCES CITED

The following references are of record in the file of this patent:

UNITED STATES PATENTS

| Number | Name | Date |
|---|---|---|
| 707,835 | Dow | Aug. 26, 1902 |
| 1,262,034 | Frazer | Apr. 9, 1918 |
| 1,379,077 | Blumenberg | May 24, 1921 |
| 1,876,879 | Drabold | Sept. 13, 1932 |
| 2,001,210 | Morse | May 14, 1935 |
| 2,309,331 | Rupp | Jan. 26, 1943 |
| 2,400,228 | Franz et al. | May 14, 1946 |

OTHER REFERENCES

Vinal, G. W.: Storage Batteries, 2nd ed. (1930), pages 267, 269.